US007360708B2

(12) United States Patent
Miyake et al.

(10) Patent No.: US 7,360,708 B2

(45) Date of Patent: Apr. 22, 2008

(54) INFORMATION PROCESSING METHOD AND SYSTEM USING TERMINAL APPARATUS

(75) Inventors: Hiroyuki Miyake, Kanagawa (JP); Yasuji Seko, Kanagawa (JP); Yoshinori Yamaguchi, Kanagawa (JP); Shoji Sakamoto, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 11/401,370

(22) Filed: Apr. 11, 2006

(65) Prior Publication Data

US 2007/0001009 A1 Jan. 4, 2007

(30) Foreign Application Priority Data

Jul. 4, 2005 (JP) .......................... P.2005-195073

(51) Int. Cl.
*G06K 7/10* (2006.01)

(52) U.S. Cl. ............ 235/472.01; 235/454; 235/472.02; 356/4.09; 356/498

(58) Field of Classification Search ............... 356/4.09, 356/3, 498, 4.1, 496, 485–486, 492, 393, 356/618, 622; 235/472.01–472.03, 454, 235/375

See application file for complete search history.

(56) References Cited

U.S. PATENT DOCUMENTS

2001/0030668 A1* 10/2001 Erten et al. ................. 345/863
2003/0107748 A1* 6/2003 Lee ............................ 356/614
2004/0004723 A1* 1/2004 Seko et al. ................. 356/498
2005/0259266 A1* 11/2005 Seko .......................... 356/498
2006/0050052 A1* 3/2006 Mekenkamp et al. ....... 345/156

FOREIGN PATENT DOCUMENTS

DE 10110979 A1 * 9/2002
JP A 2003-70075 3/2003

OTHER PUBLICATIONS

Derwent Abstract of DE 10110979 A1, Jarczyk et al., Derwent week 2003-060449.*
English Translation from EPO website of DE 10110979 A1, Jarczyk et al.,Sep. 2002.*

* cited by examiner

*Primary Examiner*—Lisa Caputo
*Assistant Examiner*—Carol Hesse
(74) *Attorney, Agent, or Firm*—Oliff & Berridge, PLC

(57) ABSTRACT

An information processing method using a terminal apparatus, including: applying light with a concentric ring-like interference fringe pattern on one of subjects by using a pointer provided in the terminal apparatus; detecting the interference fringe pattern by using a detector; calculating an optical axis of the pointer on the basis of a detection signal obtained from the detector; specifying attribute information of the subject on the basis of arrangement information of the subject intersected by the optical axis in the condition that arrangement information of the subjects and attribute information of the subjects are stored in a storage device in advance while the arrangement information of each subject and the attribute information of the subject are associated with each other; and displaying the attribute information of the specified subject on the terminal apparatus.

15 Claims, 10 Drawing Sheets

8: ROOM
7: DETECTOR
2: INTERFERENCE FRINGE PATTERN
11: OPTICAL AXIS
3: POINTER
SUBJECT
1
5: DISPLAY SCREEN
IJ-001 inkjet printer ink: full status: idle
6: PORTABLE TERMINAL
4: COMMUNICATION DEVICE
10
9
PC
DB
BASE STATION
62
DB
63
61

INFORMATION PROCESSING METHOD AND SYSTEM USING TERMINAL APPARATUS

BACKGROUND OF THE INVENTION

1. Field of the Invention

The present invention relates to an information processing method and system using a terminal apparatus. Particularly, it relates to an information processing method and system using a terminal apparatus, in which a subject is indicated by the terminal apparatus so that attribute information of the subject is displayed on the terminal apparatus.

2. Description of the Related Art

Nowadays, there are often various kinds of electric and electronic apparatuses arranged in a home or in an office. In this case, it is necessary to operate these apparatuses by use of remote controllers in accordance with these apparatuses or by use of operating buttons attached to these apparatuses. Although examples of these apparatuses may include a television set, a DVD recorder, an air conditioner, a refrigerator, a washing machine, a ceiling (lighting fixture), a personal computer, a printer, a facsimile machine, a copying machine, etc., the invention is not limited thereto. In the case where one of these apparatuses needs to be operated, it is necessary to find the place where the remote controller of the apparatus is located when the remote controller is not at hand, or it is necessary to go to the place where the apparatus is located, so as to operate the apparatus. For this reason, operability is poor. In addition, when one of these apparatuses needs to be repaired or exchanged for a new apparatus, instructions for the apparatus has to be found and read or the apparatus has to be checked immediately, in order to know how to repair, the new apparatus to be exchanged, or how to exchange. This is inconvenient.

In connection with this kind of problem, for example, JP-A-2003-70075 has proposed an adaptive operation aid apparatus for simplifying selection of a plurality of kinds of electronic apparatuses and selection of a plurality of kinds of actions of each electronic apparatus. In such an aid apparatus, a portable phone device is used for selection of the electronic apparatuses or selection of the actions of the apparatus. Therefore, electronic apparatuses such as a television set, a telephone, an interphone, etc. can be operated. On a liquid crystal display panel of the portable phone device, the electronic apparatuses and the actions of the electronic apparatuses are displayed. When one of these electronic apparatuses is selected, various kinds of actions each of which can be achieved by the selected electronic apparatus are displayed. At the time of display, these actions are displayed in order of frequency in use so that selection from these actions can be made. Accordingly, selection of an action with highest priority can be made and the number of operations on the portable phone device can be reduced so that improvement in operability can be improved.

In the method disclosed in JP-A-2003-70075, an operation of selecting a desired one from a plurality of electronic apparatuses is required first. However, it cannot be said that the method is sufficient in terms of operability. In this method, there is a problem that operability is deteriorated as the number of electronic apparatuses as objects to be operated increases. This is because it is not easy to select a desired one from a large number of electronic apparatuses on a small display screen of the portable phone device. When electronic apparatuses of this type have to be repaired or exchanged for new apparatuses in the background-art method, it is necessary to refer to instructions for these apparatuses and make phone calls or send messages through a facsimile machine in order to make repair requests for the apparatuses individually or place orders for the new apparatuses to be exchanged. This leaves room for improvement.

SUMMARY OF THE INVENTION

Accordingly, the invention provides an information processing method and system using a terminal apparatus, in which a subject is indicated by the terminal apparatus so that attribute information of the subject is displayed on the terminal apparatus.

The invention may provide an information processing method using a terminal apparatus, including: applying light with a concentric ring-like interference fringe pattern on one of subjects by using a pointer provided in the terminal apparatus; detecting the interference fringe pattern by using a detector; calculating an optical axis of the pointer on the basis of a detection signal obtained from the detector; specifying attribute information of the subject on the basis of arrangement information of the subject intersected by the optical axis in the condition that arrangement information of the subjects and attribute information of the subjects are stored in a storage device in advance while the arrangement information of each subject and the attribute information of the subject are associated with each other; and displaying the attribute information of the specified subject on the terminal apparatus.

The invention may provide an information processing system using a terminal apparatus, including: a terminal apparatus including a pointer, and a communication device, the pointer being provided for applying light with a concentric ring-like interference fringe pattern on one of subjects to indicate the subject; a detector for detecting the interference fringe pattern; a storage device for storing arrangement information of the subjects and attribute information of the subjects in advance while associating the arrangement information of the subjects with the attribute information of the subjects; and an arithmetic unit for calculating an optical axis of the pointer on the basis of a detection signal obtained from the detector and specifying a subject intersected by the optical axis on the basis of the optical axis and the arrangement information of the subjects; wherein the attribute information of the specified subject is transmitted to the communication device of the terminal apparatus and displayed on the terminal apparatus.

The invention may provide a terminal device including: a pointer for applying light with a concentric ring-like interference fringe pattern on one of subjects to indicate the subject; a communication device for receiving attribute information of the subject intersected by an optical axis of the pointer, the optical axis being calculated on the basis of a detection signal of the interference fringe pattern; and a display device for displaying the received attribute information of the subject.

BRIEF DESCRIPTION OF THE DRAWINGS

An embodiment may be described in detail with reference to the accompanying drawings.

DETAILED DESCRIPTION OF THE INVENTION

An embodiment of the invention will be described below. Although the embodiment will be described on the case where a portable terminal is taken as an example of a terminal apparatus, the invention is not limited thereto. In other words, though a portable terminal such as a portable phone, a PDA, etc. is preferably used as a terminal apparatus in the invention because of its small size and lightweight, the invention is not limited thereto. For example, a personal computer (PC) such as a notebook-size PC may be used as the terminal apparatus. Although the embodiment will be described on the case where a display screen is taken as an example of a means for displaying attribute information of a subject on the terminal apparatus, the invention includes not only a display device such as a display screen enabling visual display but also a display device enabling acoustic display through sound, voice, etc. or enabling permanent visual display on a sheet of paper, etc.

Figure 1:
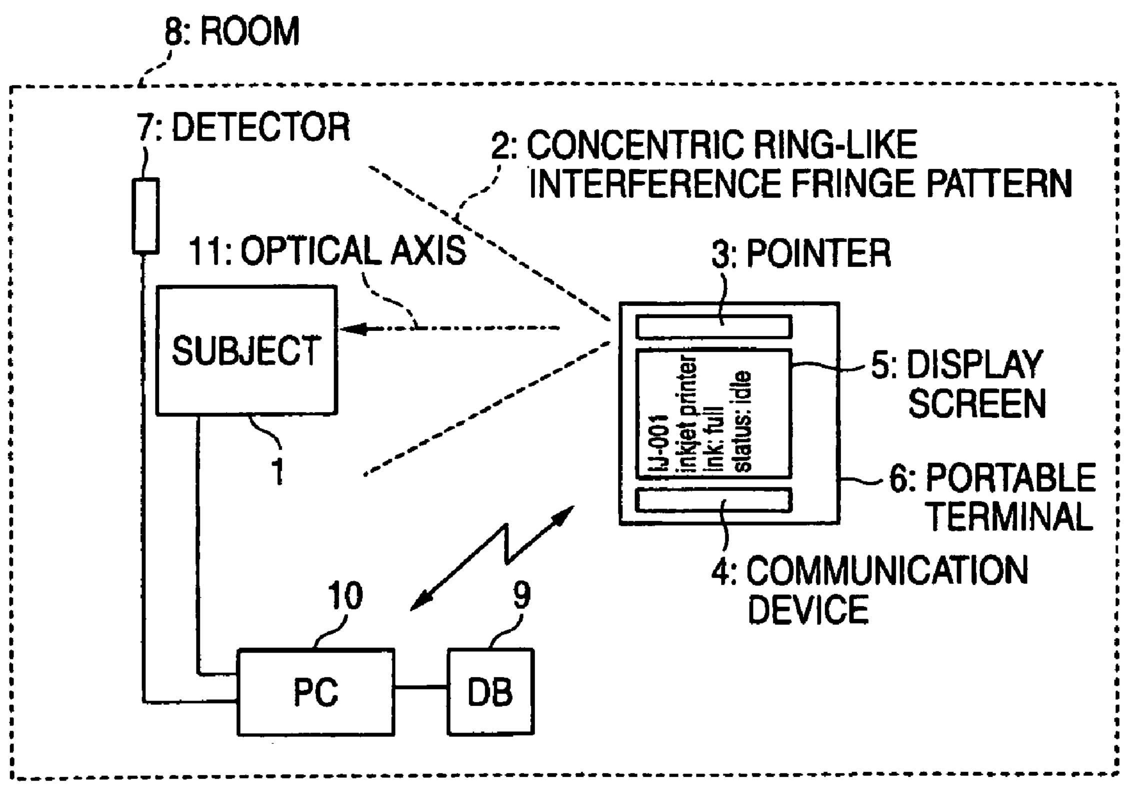
FIG. 1 is a view showing an embodiment of an information processing system using a terminal apparatus according to the invention.

FIG. 1 is a view showing an embodiment of an information processing system using a terminal apparatus according to the invention. As shown in FIG. 1, the information processing system includes a portable terminal 6, a detector 7, and an arithmetic unit (such as a personal computer PC) 10. The portable terminal 6 has a pointer 3, a communication device 4, and a display screen 5. The pointer 3 applies light with a concentric ring-like interference fringe pattern 2 on a subject 1 such as an electrical and electronic apparatus. The detector 7 detects the interference fringe pattern 2. The arithmetic unit 10 is connected to a storage device 9. The storage device 9 has a database (DB) in which arrangement information concerned with the arrangement of the subject 1 in a room 8 and attribute information concerned with the attribute of the subject 1 are stored while the arrangement information and the attribute information are associated with each other. In this embodiment, for example, the arrangement information of the subject 1 is stored as coordinate information indicating a region of the room where the subject is arranged. When, for example, the subject 1 is a television set, the attribute information of the subject 1 contains the currently selected channel, the current volume of the TV set, etc. When, for example, the subject 1 is a ceiling, the attribute information of the subject 1 contains the current model number of a fluorescent lamp, the installation date of the fluorescent lamp, etc. When, for example, the subject 1 is a printer, the attribute information of the subject 1 contains the current model number of the printer, the current operating state of the printer, etc. The number of subjects 1 maybe one or maybe two or more. The PC 10 calculates an optical axis (indicating direction) 11 of the pointer 3 based on a signal detected by the detector 7, specifies a subject 1 intersected by the optical axis 11 on the basis of the optical axis 11 and the arrangement information of the subject 1 and transmits the attribute information of the specified subject 1 to the communication device 4 of the portable terminal 6 to display the attribute information of the specified subject 1 on the display screen 5, for example, using liquid crystal, etc.

In the embodiment, arrangement information of a plurality of subjects in the room is stored as a database in the storage device 9 in advance in the aforementioned manner. The storage device 9 can be provided in the inside or outside of the PC 10. The pointer 3 has a special lens for generating light with a concentric ring-like interference fringe pattern. The pointer 3 is incorporated in the portable terminal 6. The pointer 3 is a device for generating light with a concentric ring-like interference fringe pattern. For example, the pointer 3 can be configured by the technique disclosed in JP-A-2004-28977. The configuration of the pointer 3 preferably used in this embodiment will be described later. The detector 7 has a photo acceptance element such as a CCD for detecting the interference fringe pattern 2. The detector 7 is disposed in the room 8. When a user uses the portable terminal 6 to indicate the direction of a desired subject 1 so that light with such a concentric ring-like interference fringe pattern 2 is applied on the subject 1, the interference fringe pattern 2 is detected by the detector 7. The PC 10 connected to the detector 7 calculates the optical axis 11 of the pointer 3 on the basis of the detected information of the interference fringe pattern 2. A method for calculating the optical axis will be described later. The subject indicated by the pointer 3 can be specified based on the optical axis 11 and the arrangement information of the subject.

The PC 10 transmits the attribute information of the subject to the portable terminal 6 by radio or by wire. Upon reception of the attribute information of the subject, the portable terminal 6 can appropriately display the received attribute information, related information stored in the portable terminal and a remote control screen on the display screen 5. On the other hand, when the user operates the remote control screen displayed on the portable terminal 6, the portable terminal 6 transmits an operation command to a corresponding subject through the PC 10. Alternatively, configuration may be made so that the portable terminal 6 directly transmits the operation command to the subject. In this manner, the user can operate any desired subject by using the portable terminal 6. Although inter communication between the portable terminal 6 and the PC 10 (or the subject) can be performed directly, such inter communication may be performed via a network such as the Internet, as will be described later. Wireless LAN, Bluetooth, infrared communication, etc. can be used as a communication means between the portable terminal 6 and the PC 10. The portable terminal 6 and the PC 10 can also communicate with each other by electronic mail. The arithmetic unit (PC) 10 and the storage device 9 may be incorporated in the portable terminal 6. In this case, the attribute information can be received through an internal line. When the direction indicating function of the pointer 3 and the input/display function of the portable terminal 6 are combined with each other in this manner, a compact and user-friendly indicator terminal can be achieved. Next, the configuration of the pointer 3 incorporated in the portable terminal 6 will be described.

Figure 2A:
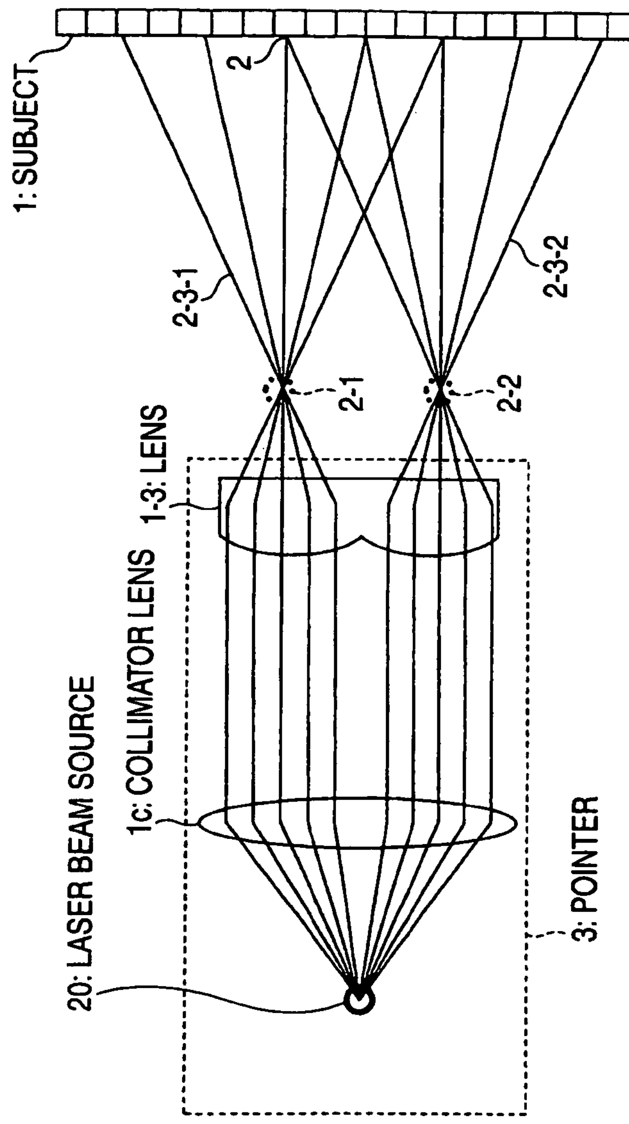
FIGS. 2A and 2B are views showing an example of a pointer provided with an optical lens system for forming a concentric ring-like interference fringe pattern from a light component transmitted through an upper half of a lens and a light component transmitted through a lower half of the lens.
Figure 2B:
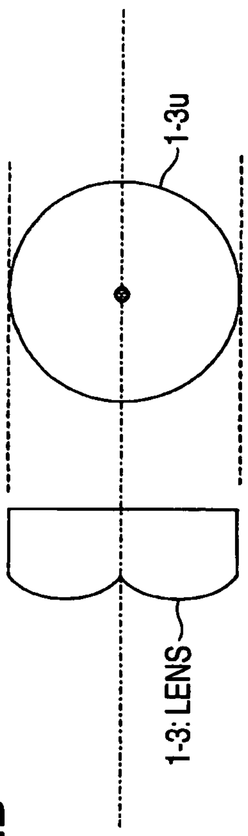

FIGS. 2A and 2B are views showing an example of a pointer having an optical lens system for forming a concentric ring-like interference fringe pattern from a light component transmitted through an upper half of a lens and a light component transmitted through a lower half of the lens.

As shown in FIG. 2A, a ring-like lens 1-3 depressed on its optical axis so as to be formed symmetrically with respective to the optical axis is used in this example. A left part of FIG. 2B shows a sectional view of the lens 1-3. A right part of FIG. 2B shows a front view of the lens 1-3*u* from a direction of a light source. Here, the outer diameter of the lens is selected to be 3 mm. An incidence surface of the lens in a plane on the optical axis is formed as an aspheric surface satisfying the relation $x=0.5*(y-1.5)^{1.5}$ (unit: mm) in which $\underline{x}$ is an x-coordinate taken on the optical axis with the direction of movement of light as a plus direction, and $\underline{y}$ is a y-coordinate taken on a radial direction perpendicular to the optical axis. A light output surface of the lens 1-3 is formed as a flat surface. The refractive index of a material of the lens is selected to be 1.51.

Light emitted from a laser beam source 20 is incident on the optical lens 1-3 through a collimator lens 1*c*. A light component transmitted through an upper half of the optical lens 1-3 with respect to the optical axis is applied on a subject 1 via light beam loci 2-3-1. Likewise, a light component transmitted through a lower half of the optical lens 1-3 with respect to the optical axis is applied on the subject 1 via light beam loci 2-3-2. Since light beams having arrived at one and the same point on the subject 1 are laser beams emitted from one and the same light source, the light beams interfere with each other to form an interference fringe pattern 2. In this manner, laser beams emitted from one light source are projected on the subject as if the laser beams were virtually emitted from two point light sources 2-1 and 2-2 in a plane on the optical axis. Although this example has shown the case where light beams from a point light source are collimated to parallel light beams by the collimator lens so that the parallel light beams are made incident on the lens 1-3, the parallel light beams can be regarded as light beams emitted from a light source located at an infinite distance. In this case, it may be conceived that the light source located at an infinite distance is virtually converted into two point light sources 2-1 and 2-2 by the lens 1-3.

Figure 3:
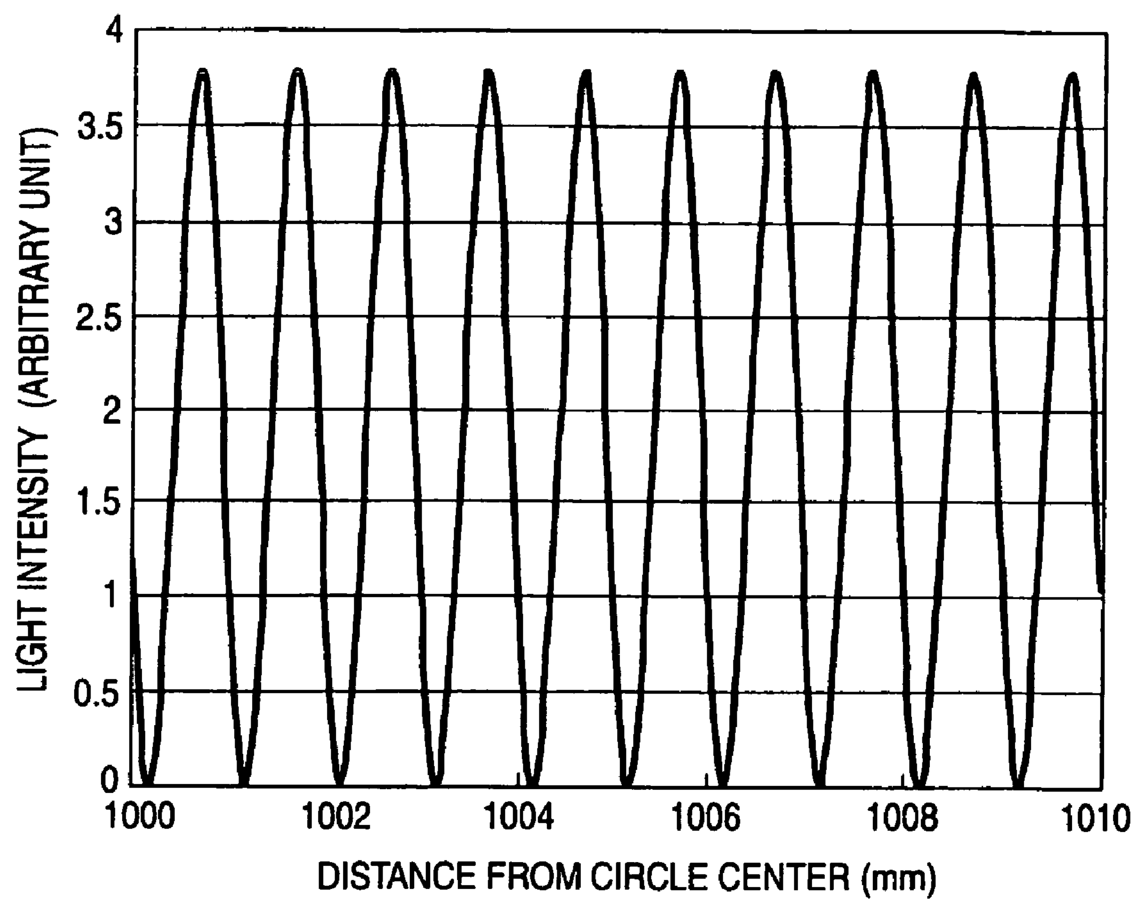
FIG. 3 shows a part of the concentric ring-like interference fringe pattern.

Simulation was made to examine what interference fringe pattern was formed when light emitted from the semiconductor laser 20 was collimated to parallel light beams by the collimator lens 1*c* so that the parallel light beams were made incident on the lens 1-3. Since light emitted from the semiconductor laser generally has a Gaussian intensity distribution, simulation was made on the assumption that the intensity of light having passed through an outer diameter portion of the lens with an outer diameter of 3 mm was reduced to 3.4% as much as the intensity of light having passed through a central portion (optical axis) of the lens. As a result, it was proved that a concentric ring-like interference fringe pattern with a diameter of about 4 m was formed on a subject located 4 mm ahead. A part of the interference fringe pattern is shown in FIG. 3. FIG. 3 shows the concentric ring-like interference fringe pattern located far by a range of 1000 mm to 1010 mm from the center of the circle. In this graph, it can be confirmed that concentric circles are formed at regular intervals of 1.0 mm.

Figure 4:
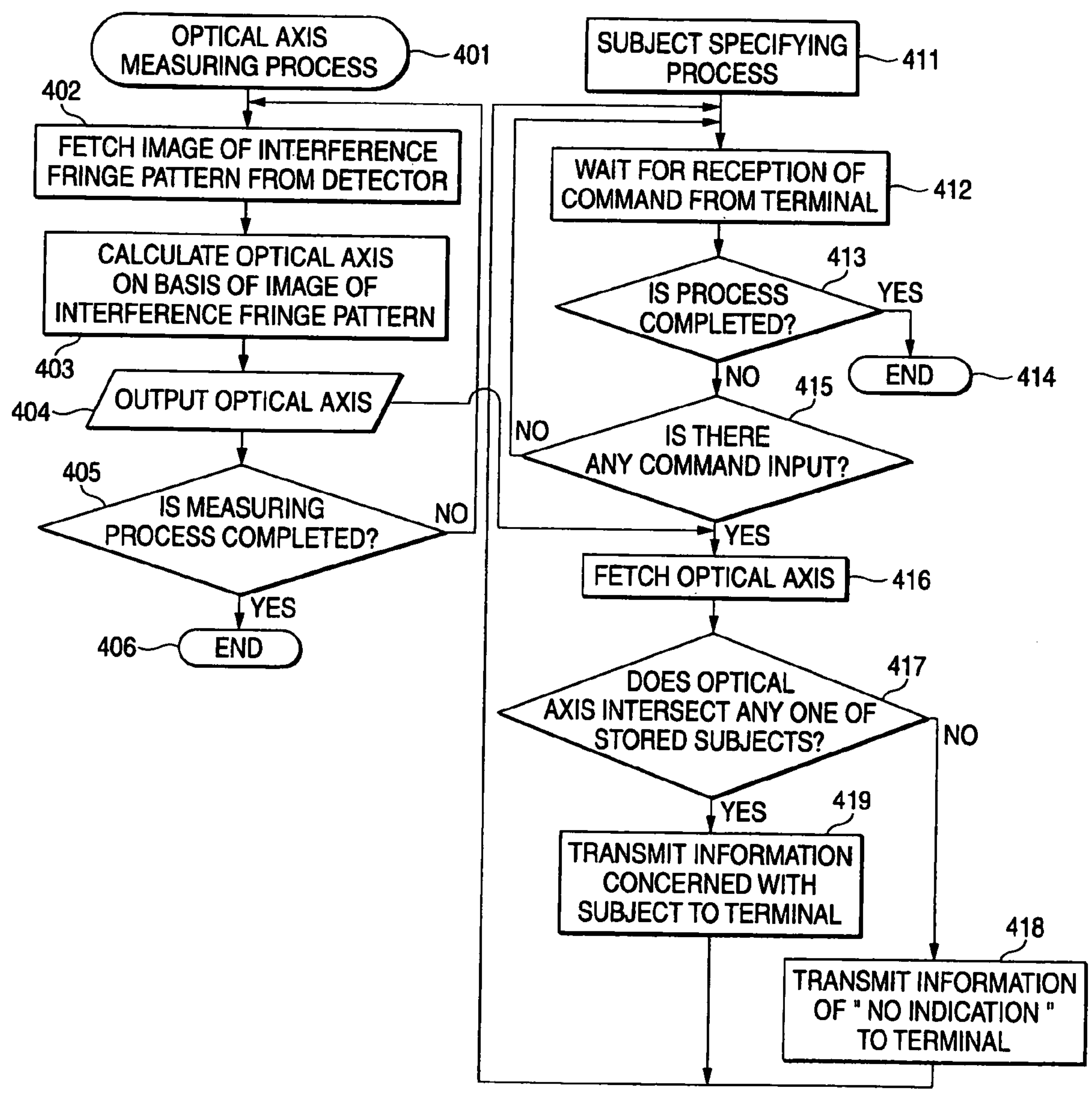
FIG. 4 is a flow chart showing an example of processing carried out by a PC shown in FIG. 1.

FIG. 4 is a flow chart showing an example of processing carried out by the PC in FIG. 1. First, in step 401, a process for measuring an optical axis (indicating direction) of the pointer 3 is started. In step 402, an image signal of an interference fringe pattern detected by the detector 7 is fetched from the detector 7. In step 403, the optical axis of the pointer 3 is calculated on the basis of the image signal of the interference fringe pattern. For example, the optical axis is calculated as follows.

Figure 5A:
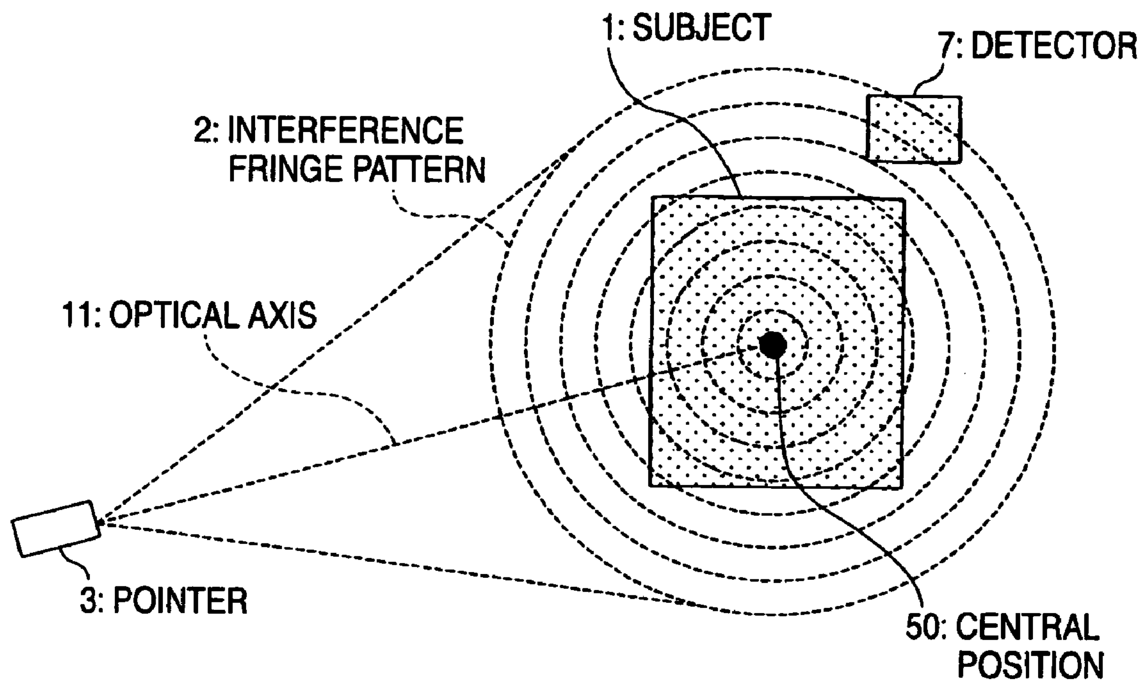
FIG. 5A is a view showing an example of a concentric ring-like interference fringe pattern detected by a detector.
Figure 5B:
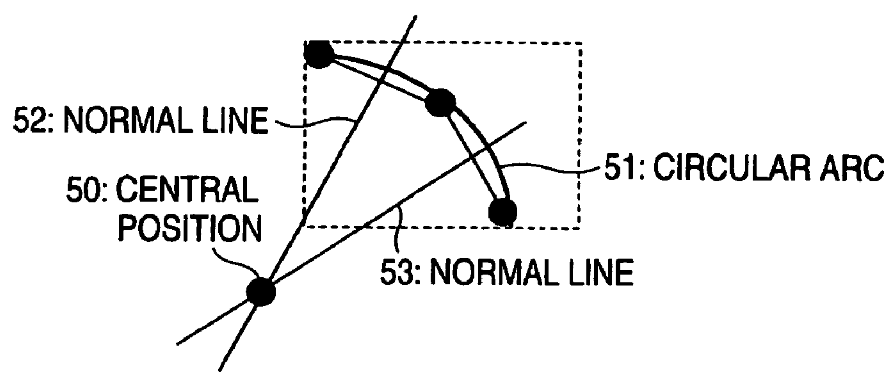
FIG. 5B is a view for explaining an example of a method for obtaining a central position of the concentric ring-like interference fringe pattern.

FIG. 5A is a view showing an example of the concentric ring-like interference fringe pattern detected by the detector. FIG. 5B is a view for explaining an example of a method for obtaining a central position of the concentric ring-like interference fringe pattern. As shown in FIG. 5A, light with the concentric ring-like interference fringe pattern 2 emitted from the pointer 3 toward the subject 1 is detected by the detector 7. The PC 10 obtains the central position 50 of the concentric ring-like interference fringe pattern 2 based on the image signal of the concentric ring-like interference fringe pattern 2, for example, in the following manner. That is, as shown in FIG. 5B, the PC 10 extracts any two points on a circular arc 51, draws a straight line connecting the two points and draws a normal line passing through a midpoint of the straight line. This operation is applied to two places to obtain two normal lines 52 and 53. Then, the PC 10 obtains a point of intersection of the two normal lines 52 and 53 and sets the intersection point as the central position 50 of the circular arc. When this processing is applied to a plurality of images, the central position 50 can be detected more accurately. The central position 50 of the circular arc serves as the indicating position of the pointer 3. A line which is perpendicular to a plane of the concentric ring-like interference fringe pattern and which passes through the central position 50 serves as the optical axis (indicating direction) of the pointer 3. Here, when information concerned with the position of the detector 7 arranged in the room is stored as a database in the storage device in advance, three-dimensional coordinates of the central position 50 of the interference fringe pattern can be obtained and the optical axis of the pointer 3 can be calculated based on the coordinate values.

Referring back to FIG. 4, description will be continued. In step 404, information concerned with the calculated optical axis of the pointer 3 is output so that the information can be used in a subject specifying process which will be described later. In step 405, a judgment is made as to whether the optical axis measuring process is completed or not. When the optical axis measuring process is not completed, the routine of processing goes back to step 402 to repeat the aforementioned steps. When the optical axis measuring process is completed, the processing is terminated in step 406.

On the other hand, in step 411, the subject specifying process is started in order to specify the subject indicated by the pointer 3. In step 412, the PC 10 waits for reception of a command from the portable terminal 6. In step 413, a judgment is made as to whether the subject specifying process is completed or not. When the subject specifying process is completed, the processing is terminated in step 414. When the subject specifying process is not completed, a judgment is made in step 415 as to whether there is any command input or not. When there is no command input, the routine of processing goes back to step 412 to repeat the aforementioned steps. When there is any command input, in step 416, information concerned with the optical axis of the pointer 3 is fetched from the step 404. In step 417, a subject intersected by the optical axis of the pointer 3 is determined on the basis of the information concerned with the optical axis of the pointer 3 and the arrangement information of the plurality of subjects stored in the storage device. The judgment as to whether the optical axis of the pointer 3 intersects a subject can be based on a judgment as to whether a vector indicating the optical axis calculated as described above passes through a region indicating one of the subjects stored in the storage device. When there is no subject intersected by the optical axis, in step 418, information of "no indication" is transmitted to the portable terminal 6. On the other hand, when there is a subject intersected by the optical axis, in step 419, the subject intersected by the optical axis is specified and attribution information of the specified subject is transmitted to the portable terminal 6. Then, the routine of processing goes back to the step 412.

In this embodiment, when a certain subject is indicated by the pointer 3 of the portable terminal 6, information concerned with the subject is transmitted to the portable terminal 6 in the aforementioned manner so that attribute information of the subject and an operation user interface are displayed on the screen of the portable terminal 6. The user can operate the portable terminal 6 while viewing the screen of the portable terminal 6 to transmit an operation command to the subject to make it possible to operate the subject.

Figure 6:
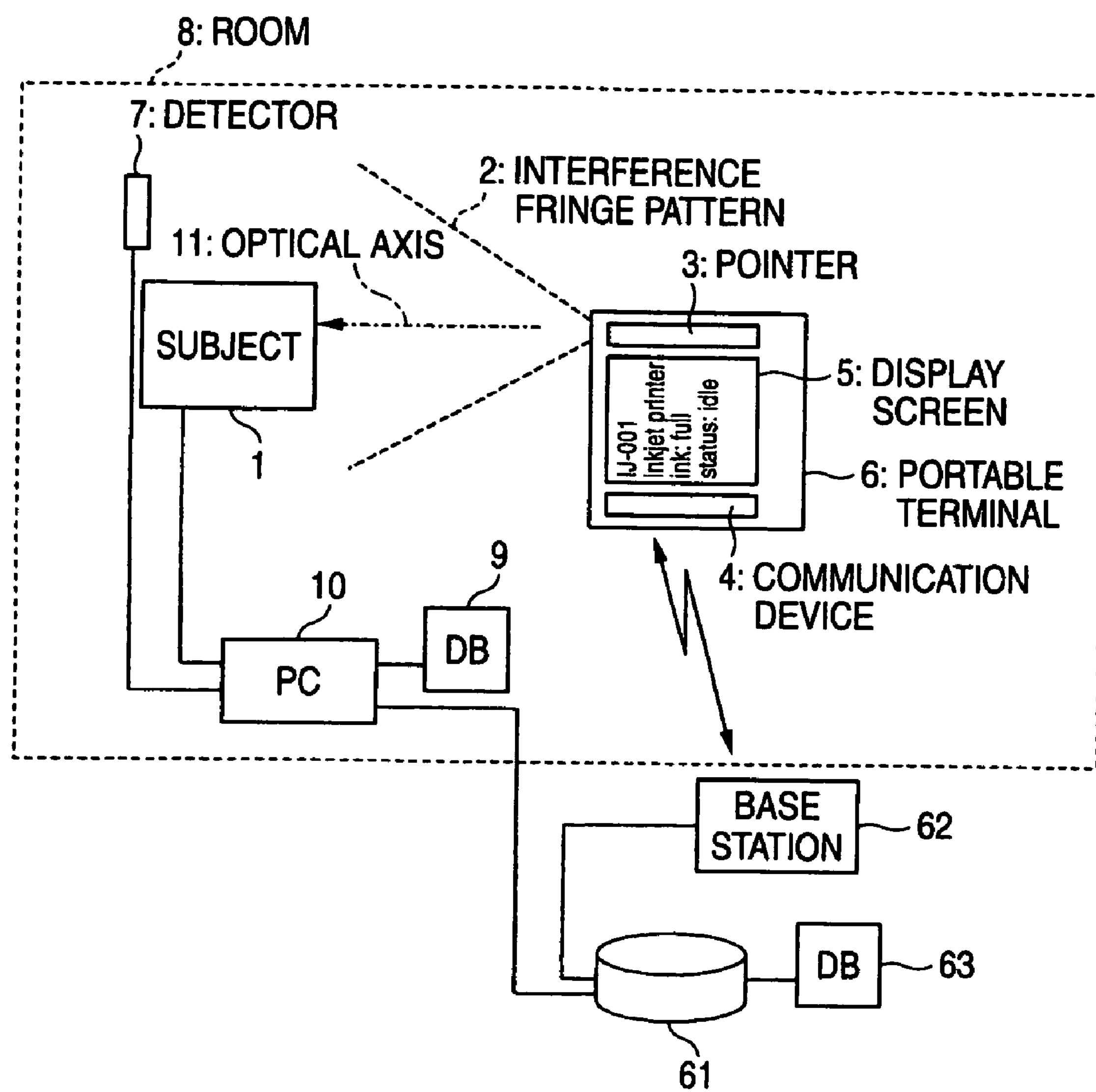
FIG. 6 is a view showing another embodiment of the information processing system using the portable terminal according to the invention.

FIG. 6 is a view showing another embodiment of the information processing system using the portable terminal according to the invention. In comparison between this embodiment and the embodiment shown in FIG. 1, this embodiment is the same as the embodiment shown in FIG. 1, except that the portable terminal 6 and the PC 10 communicate with each other through a server 61 and a base station 62 which are connected to the outside of the room 8. In this embodiment, communication can be made by wireless LAN or Web using portable packet communication or through a network such as electronic mail or the Internet.

In this embodiment, as shown in FIG. 6, when the user indicates the direction of a desired subject 1 by using the portable terminal 6 so that light with the concentric ring-like interference fringe pattern 2 is applied on the desired subject 1, the interference fringe pattern 2 is detected by the detector 7. The PC 10 connected to the detector 7 calculates an optical axis 11 of the pointer 3 on the basis of the detected information of the interference fringe pattern 2. A method for calculating the optical axis has been described above. The subject indicated by the pointer 3 can be specified on the basis of the optical axis 11 and arrangement information of a plurality of subjects stored in the storage device. Processing carried out by the PC 10 in this embodiment is the same as that shown in the flow chart of FIG. 4.

The PC 10 transmits attribute information of the specified subject 1 to the portable terminal 6 through the server 61 and the base station 62. Upon reception of the attribute information of the subject 1, the portable terminal 6 can appropriately display the received attribute information, related information stored in the portable terminal and a remote control screen on the display screen 5. When the user operates the portable terminal 6, the portable terminal 6 transmits an operation command to a corresponding subject through the base station 62, the server 61 and the PC 10. In this manner, the user can operate the desired subject by operating the portable terminal 6.

In this embodiment, the attribute information of the subjects may be stored as a database (DB) in the storage device 9 connected to the PC 10 or may be stored as a database (DB) in a storage device 63 connected to the server 61. When the storage device 63 is used, attribute information concerned with subjects located in other rooms or departments can be collectively stored and managed.

Figure 7:
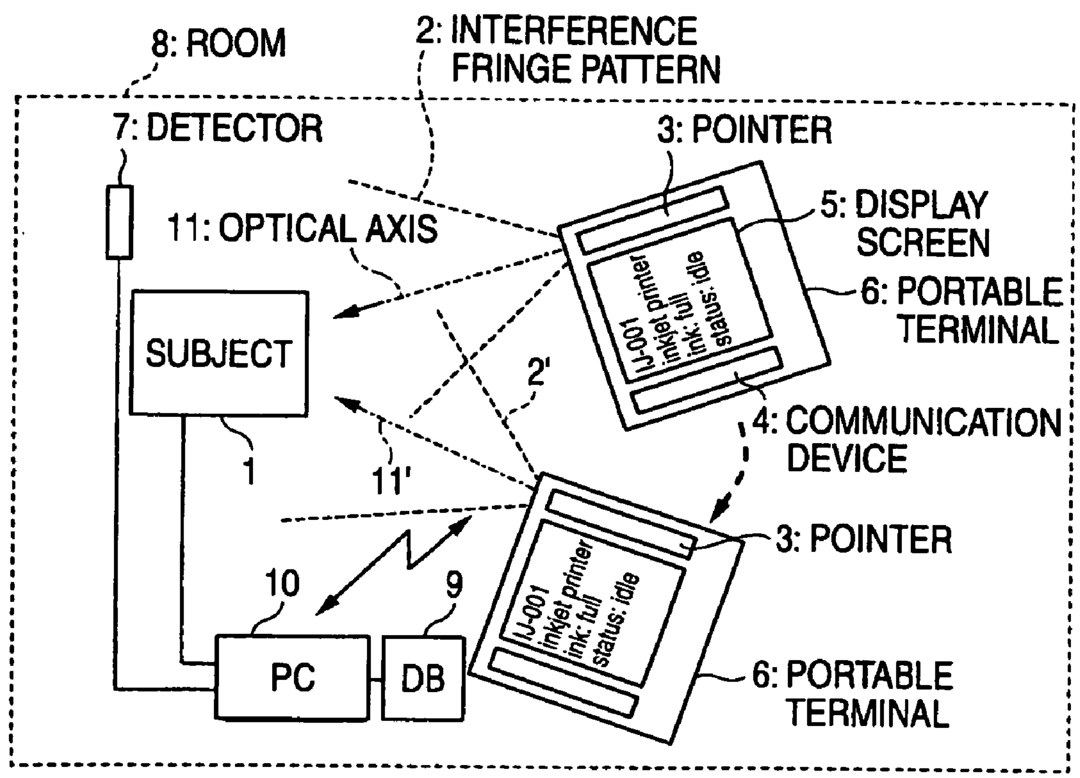
FIG. 7 is a view showing a further embodiment of the information processing system using the portable terminal according to the invention.

FIG. 7 is a view showing a further embodiment of the information processing system using the portable terminal according to the invention. In this embodiment, a subject 1 is indicated by a pointer 3 moved in two places so that arrangement information of the subject 1 in a room 8 is stored in a storage device to indicate a region (coordinate information) of the subject in a virtual space. That is, in order to obtain the arrangement information of the subject 1, first, the subject 1 is indicated by the pointer 3 of the portable terminal 6 located in a certain position as shown in FIG. 7. Light with a concentric ring-like interference fringe pattern 2 at this time is detected by a detector 7. The PC 10 connected to the detector 7 calculates an optical axis 11 of the pointer 3 in the aforementioned manner on the basis of the detected information of the interference fringe pattern 2. Then, after the portable terminal 6 is moved to another position, the subject 1 is indicated by the pointer 3 located in the other position. Light with a concentric ring-like interference fringe pattern 2' at this time is also detected by the detector 7. The PC 10 connected to the detector 7 calculates an optical axis 11' of the pointer 3 in the aforementioned manner on the basis of the detected information of the interference pattern 2'. A region near a point of intersection of the two optical axes (but including the intersection point) is obtained and set as coordinate values (coordinate information) of the subject 1. A method for obtaining the region near the intersection point will be described later.

Figure 8:
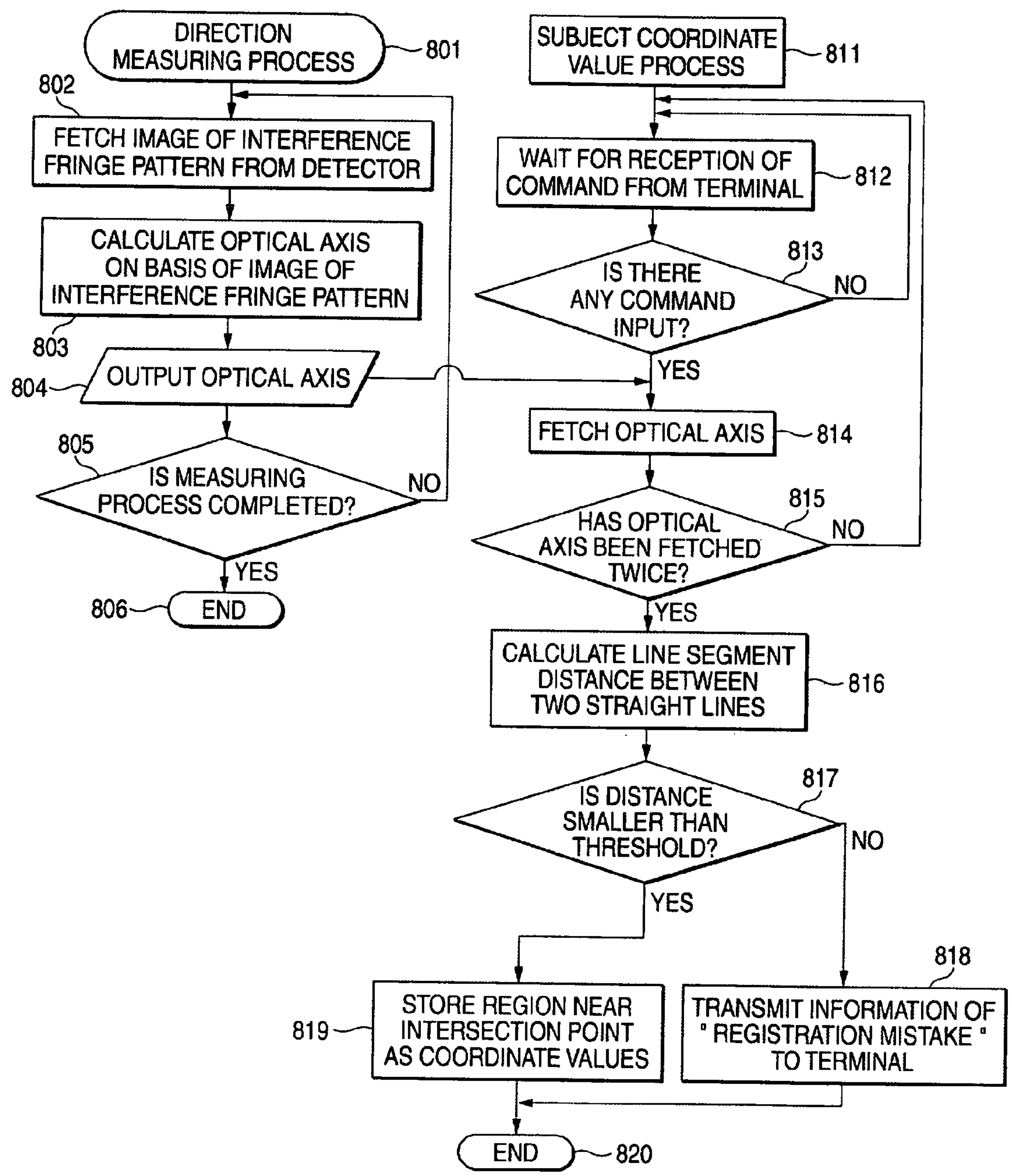
FIG. 8 is a flow chart showing an example of processing carried out by a PC shown in FIG. 7.

FIG. 8 is a flow chart showing an example of processing carried out by the PC shown in FIG. 7. First, in step 801, a process for measuring an optical axis (indicating direction) of the pointer 3 is started. In step 802, an image signal of an interference fringe pattern detected by the detector 7 is fetched from the detector 7. In step 803, the optical axis of the pointer 3 is calculated on the basis of the image signal of the interference fringe pattern. For example, the optical axis is calculated in the aforementioned manner. In step 804, information concerned with the calculated optical axis of the pointer 3 is output so that the information can be used in a subject coordinate value (coordinate information) storage process which will be described later. In step 805, a judgment is made as to whether the optical axis measuring process is completed or not. When the optical axis measuring process is not completed, the routine of processing goes back to the step 802 to repeat the aforementioned steps. When the optical axis measuring process is completed, the processing is terminated in step 806. In this example, after the portable terminal 6 is moved, the aforementioned steps are repeated so that two optical axes of the pointer 3 corresponding to two places are calculated and output.

On the other hand, in step 811, the subject coordinate value (coordinate information) process is started in order to obtain arrangement information (coordinate information) of the subject indicated by the pointer 3. In step 812, the PC 10 waits for reception of a command from the portable terminal 6. In step 813, a judgment is made as to whether there is any command input or not. When there is no command input, the routine of processing goes back to the step 812 to repeat the aforementioned steps. When there is any command input, in step 814, information concerned with the optical axis of the pointer 3 is fetched from the aforementioned step 804. In step 815, a judgment is made as to whether information concerned with the optical axis of the pointer 3 has been fetched twice or not. When the information has not been fetched twice yet, the routine of processing goes back to the step 812 to repeat the aforementioned steps. When the information has been already fetched twice, the line segment distance between the two optical axes is calculated in step 816. For example, the line segment distance between the two optical axes is calculated as follows.

Figure 9:
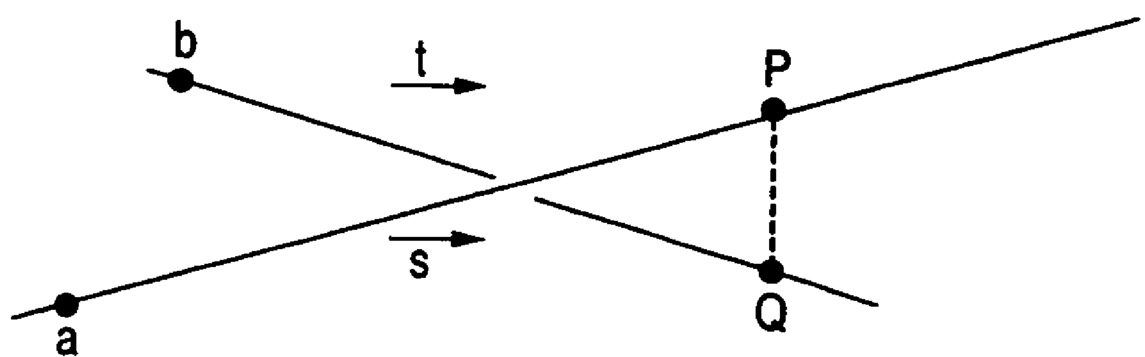
FIG. 9 is a view for explaining an example of the method for obtaining the shortest distance between two straight lines.

FIG. 9 is a view for explaining an example of the method for obtaining the shortest distance between two straight lines. As shown in FIG. 9, consider now a straight line of a direction (unit) vector $\underline{s}$ passing through a point $\underline{a}$ and a straight line of a direction vector $\underline{t}$ passing through a point $\underline{b}$. Assume that P and Q are points which are on the two straight lines respectively so that the distance between the two points is the shortest distance between the two straight lines. The two straight lines can be expressed as follows.

$$\vec{P}=\vec{a}+m\cdot\vec{s} \quad (1)$$

$$\vec{Q}=\vec{b}+n\cdot\vec{t} \quad (2)$$

Because the fact that the length of a line segment PQ is equal to the shortest distance between the two straight line means the fact that the line segment PQ is perpendicular to the two straight lines, the sum of the inner product of the direction vector of one straight line and the vector PQ and the inner product of the direction vector of the other straight line and the vector PQ is zero.

$$\vec{P}\cdot(\vec{P}-\vec{Q})=0 \quad (3)$$

$$\vec{Q}=(\vec{P}-\vec{Q})=0 \quad (4)$$

Since the points $\underline{a}$ and $\underline{b}$ and the vectors $\underline{s}$ and $\underline{t}$ can be obtained on the basis of measurement of a concentric ring-like interference fringe pattern, unknown quantities $\underline{m}$ and $\underline{n}$ can be obtained as follows. When the expressions (1) and (2) are put in the expressions (3) and (4), the unknown quantities m and $\underline{n}$ can be calculated. When the quantities $\underline{m}$ and $\underline{n}$ are put in the expressions (1) and (2), coordinates of the points P and Q can be calculated. The line segment distance between the two optical axes can be obtained on the basis of the coordinates of the points P and Q.

Referring back to FIG. 8, description will be continued. In step 817, a judgment is made as to whether the obtained line segment distance is smaller than a threshold or not. When the line segment distance is not smaller than the threshold, in step 818, information of "registration mistake" is transmitted to the portable terminal because the line segment distance is unsuitable for the coordinate values of the subject to be stored. When the line segment distance is smaller than the threshold, in step 819, a region near the intersection point is calculated on the basis of the coordinates of the points P and Q and stored as coordinate values (coordinate information) of the subject in the storage device. Then, the routine of processing is terminated in step 820.

For example, the region near the point of intersection of the two optical axes can be calculated on the basis of the coordinates of the points P and Q as follows. As the simplest method, the region can be set in the form of an adequate three-dimensional region including the points P and Q. The region may be input in an interactive manner so that the region can be input as a region closer to the real region, compared with the case where the region is calculated automatically. For example, the region is calculated by the steps of:

1. presenting candidates of the three-dimensional region such as a rectangular parallelepiped, a circular cylinder, a cone, a tetragonal spindle, a sphere, etc. with the line segment as its center on the basis of the coordinates of the points P and Q;

2. urging the user to input parameters corresponding to the three-dimensional region when one of the candidates is selected by the user, the parameters being width, height and depth when a rectangular parallelepiped is selected, the parameters being diameter and height when a circular cylinder is selected, the parameters being diameter when a sphere is selected; and 3. urging the user to input values to correct the position when the respective numerical values are input, because the region indicated by the pointer is not always located in the center of the subject.

In this manner, input of arrangement information (coordinate parameters) of the certain subject in a virtual space is completed. According to this embodiment, a means for inputting arrangement information of a subject in a room can be formed so that the subject is indicated by the portable terminal moved in two places so that a region (including a point of intersection of two optical axes) near the point of intersection of the two optical axes can be registered as arrangement information of the subject.

Figure 10A:
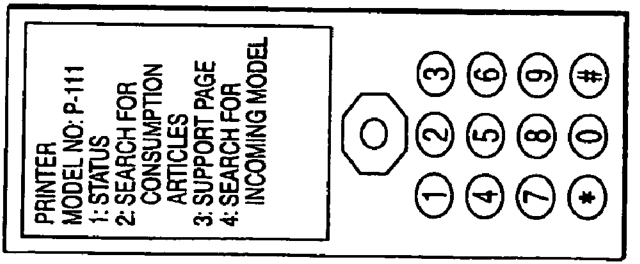
FIGS. 10A to 10E are views showing a further embodiment of the information processing system using the portable terminal according to the invention.

FIGS. 10A to 10E are views showing a further embodiment of the information processing system using the portable terminal according to the invention. In this embodiment, there is provided a means for performing control and/or maintenance of each subject on a display screen of the portable terminal. When, for example, a printer provided in a room is indicated by the portable terminal, a screen for performing maintenance of the printer as shown in FIG. 10A is displayed on the portable terminal. In this embodiment, items concerned with the printer, such as "MODEL NO: P-111", "1: STATUS", "2: SEARCH FOR CONSUMPTION ARTICLES", "3: SUPPORT PAGE", and "4: SEARCH FOR INCOMING MODEL", are displayed on the display screen.

Figure 10B:
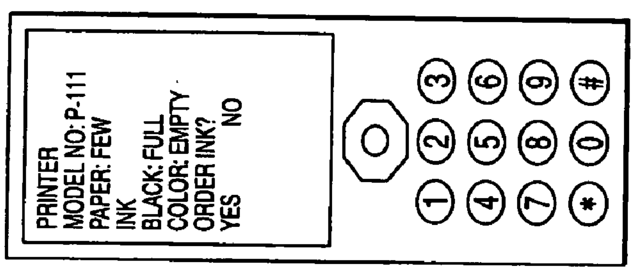

When "1" is keyed in through a numeric keypad of the portable terminal on the screen shown in FIG. 10A, the present status of the printer is displayed on the screen as shown in FIG. 10B. In this example, the status of the printer is displayed as "PAPER: FEW", "INK: BLACK: FULL", "COLOR: EMPTY", and "ORDER INK?: Yes No". In this case, the color ink is empty. Accordingly, when, for example, "Yes" is selected on the screen, ink as a replacement can be ordered through the Internet. That is, in this embodiment, consumption articles used in the printer can be ordered by electronic mail on the display screen of the portable terminal.

Figure 10C:
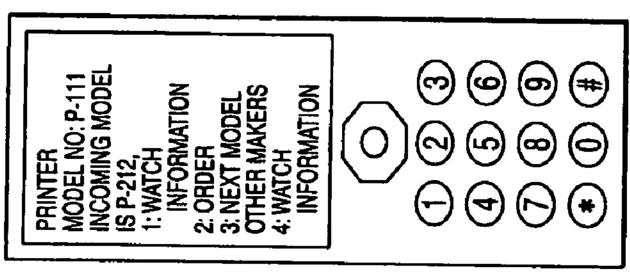

When, for example, "4" is keyed in through the numeric keypad of the portable terminal on the screen shown in FIG. 10A, a result of the search for incoming model to replace the printer is displayed on the display screen as shown in FIG. 10C. In this example, the fact that the incoming model to replace the printer is P-212 is displayed. Further, options such as "1: WATCH INFORMATION", "2: ORDER", "3: NEXT MODEL, OTHER MAKERS", "4: WATCH INFORMATION" are prepared. In this manner, in the embodiment, attribute information of the subject can be obtained so that a product like the subject can be searched for through the network and the product can be ordered by electronic mail as occasion demands.

Figure 10D:
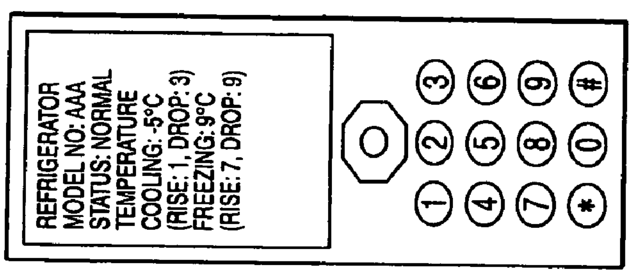

When, for example, a refrigerator in the room is indicated by the portable terminal, a screen for indicating the status of the refrigerator and controlling the status of the refrigerator is displayed on the portable terminal as shown in FIG. 10D. In this example, items concerned with the refrigerator, such as "MODEL NO: AAA", "STATUS: NORMAL", "TEMPERATURE: FREEZING: −5° C., (RISE: 1, DROP: 3)", and "COOLING: 9° C., (RISE: 7, DROP: 9)", are displayed on the display screen. When, for example, "1" is keyed in through the numeric keypad of the portable terminal, the freezing setting temperature rises. When, for example, "3" is keyed in through the ten numeric keypad of the portable terminal, the freezing setting temperature drops. When, for example, "7" is keyed in through the numeric keypad of the portable terminal, the cooling setting temperature rises. When, for example, "9" is keyed in through the numeric keypad of the portable terminal, the cooling setting temperature drops. That is, in the embodiment, the internal temperature of the refrigerator can be controlled from the portable terminal. Although the embodiment has been described on the case where the refrigerator is controlled, the invention is not limited thereto. For example, in the case where the subject is a television set, control such as powering on/off of the television set, volume adjustment, channel change, etc. can be performed based on the display screen of the portable terminal.

Figure 10E:
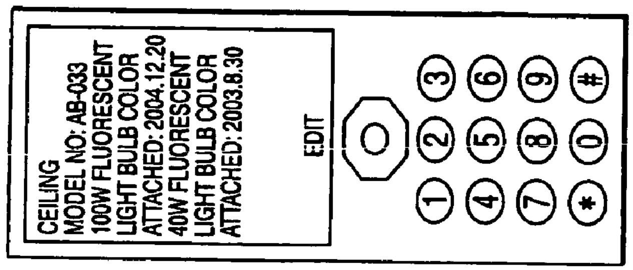

When, for example, a ceiling (lighting fixture) in the room is indicated by the portable terminal, a screen concerned with the ceiling as shown in FIG. 10E is displayed on the portable terminal. In this example, items concerned with the ceiling, such as "MODEL NO: AB-0033", "100 W FLUORESCENT LIGHT BULB COLOR", "INSTALLED: 2004.12.20", "40 W FLUORESCENT LIGHT BULB COLOR", and "INSTALLED: 2003.8.30" are displayed on the display screen. When a fluorescent light bulb in the ceiling is exchanged for a new one, information about exchange date, etc. can be input not from the PC managing the information as a database, but from the numeric keypad of the portable terminal manually. In this manner, in this embodiment, attribute information of the subject can be obtained on the portable terminal and changed on the portable terminal.

In this manner, in the invention, when an operation command is transmitted from the portable terminal to a desired subject, maintenance or control of the subject can be performed.

The invention relates to an information processing method and system using a terminal apparatus. Particularly, it relates to an information processing method and system using a terminal apparatus, in which a subject is indicated by the terminal apparatus so that attribute information of the subject is displayed on a display screen of the terminal apparatus. The invention therefore has industrial applicability.

According to the invention, it is possible to provide an information processing method and system using a terminal, in which a subject is indicated by the terminal apparatus so that attribute information of the subject is displayed on the terminal apparatus. Accordingly, by the behavior to indicate a subject (substance) in a real space, information concerned with the indicated subject can be browsed on a display device such as a display screen of the terminal apparatus at hand. The user can operate the subject in a key operation manner or in a touch panel operation manner by using the display device. The operation easy for the user to understand can be provided. Moreover, when the subject has to be repaired or exchanged for a new subject, the user can send a request to repair the subject or can order a new subject as a replacement through a network such as the Internet in a key operation manner or in a touch panel operation manner by using the display device of the terminal apparatus.

The entire disclosure of Japanese Patent Application No.2005-195073 filed on Jul. 4, 2005 including specification, claims, drawings and abstract is incorporated herein by reference in its entirety.

What is claimed is:

1. An information processing method using a terminal apparatus, comprising: applying light with a concentric ring interference fringe pattern on one of subjects by using a pointer provided in the terminal apparatus; detecting the interference fringe pattern by using a detector; calculating an optical axis of the pointer on the basis of a detection signal obtained from the detector; specifying attribute information of the subject on the basis of arrangement information of the subject intersected by the optical axis in the condition that arrangement information of the subjects and attribute information of the subjects are stored in a storage device in advance while the arrangement information of each subject and the attribute information of the subject are associated with each other; and displaying the attribute information of the specified subject on the terminal apparatus.

2. The information processing method using a terminal apparatus according to claim 1, wherein the terminal apparatus transmits an operation command for operating the subject to the subject on the basis of the attribute information of the subject.

3. The information processing method using a terminal apparatus according to claim 2, wherein the operation command is used for performing maintenance of the subject.

4. The information processing method using a terminal apparatus according to claim 2, wherein the operation command is used for performing control of the subject.

5. The information processing method using a terminal apparatus according to claim 2, wherein the operation command is transmitted to the subject via a network.

6. The information processing method using a terminal apparatus according to claim 1, wherein the attribute information of the specified subject is transmitted to the terminal apparatus via a network.

7. The information processing method using a terminal apparatus according to claim 1, wherein the terminal apparatus is moved so that two optical axes of the pointer are calculated in two places, and a near intersection region in which the distance between the calculated two optical axes is smaller than a threshold is obtained and stored as the arrangement information of the subject in the storage device.

8. An information processing system using a terminal apparatus, comprising: a terminal apparatus including a pointer, and a communication device, the pointer being provided for applying light with a concentric ring interference fringe pattern on one of subjects to indicate the subject; a detector for detecting the interference fringe pattern; a storage device for storing arrangement information of the subjects and attribute information of the subjects in advance while associating the arrangement information of the subjects with the attribute information of the subjects; and an arithmetic unit for calculating an optical axis of the pointer on the basis of a detection signal obtained from the detector and specifying a subject intersected by the optical axis on the basis of the optical axis and the arrangement information of the subjects; wherein the attribute information of the specified subject is transmitted to the communication device of the terminal apparatus and displayed on the terminal apparatus.

9. The information processing system using a terminal apparatus according to claim 8, wherein the terminal apparatus can transmit an operation command for operating the subject to the subject on the basis of the attribute information of the subject.

10. The information processing system using a terminal apparatus according to claim 9, wherein the operation command is used for performing maintenance of the subject.

11. The information processing system using a terminal apparatus according to claim 9, wherein the operation command is used for performing control of the subject.

12. The information processing system using a terminal apparatus according to claim 9, wherein the operation command can be transmitted to the subject via a network.

13. The information processing system using a terminal apparatus according to claim 8, wherein the attribute information of the specified subject can be transmitted to the terminal apparatus via a network through a server connected to the arithmetic unit.

14. The information processing system using a terminal apparatus according to claim 13, wherein the storage device includes a first storage device for storing the arrangement information of the subjects and a second storage device for storing the attribute information of the subjects;

the first storage device is connected to the arithmetic unit; and the second storage device is connected to the server.

15. The information processing system using a terminal apparatus according to claim 8, wherein the terminal apparatus is moved so that the arithmetic unit calculates two optical axes of the pointer in two places, and obtains and stores a near intersection region in which the distance between the calculated two optical axes is smaller than a threshold, as the arrangement information of the subject in the storage device.

* * * * *